United States Patent
Shimizu

(10) Patent No.: US 10,097,226 B2
(45) Date of Patent: Oct. 9, 2018

(54) WIRELESS COMMUNICATION APPARATUS AND STRUCTURE FOR MOUNTING COMMUNICATION EQUIPMENT

(71) Applicant: NEC Corporation, Tokyo (JP)

(72) Inventor: Masatoshi Shimizu, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/115,031

(22) PCT Filed: Jan. 19, 2015

(86) PCT No.: PCT/JP2015/000187
§ 371 (c)(1),
(2) Date: Jul. 28, 2016

(87) PCT Pub. No.: WO2015/125408
PCT Pub. Date: Aug. 27, 2015

(65) Prior Publication Data
US 2016/0352376 A1    Dec. 1, 2016

(30) Foreign Application Priority Data
Feb. 18, 2014 (JP) .................. 2014-028298

(51) Int. Cl.
*H04B 1/38* (2015.01)
*H04B 1/03* (2006.01)

(52) U.S. Cl.
CPC .................. *H04B 1/38* (2013.01); *H04B 1/03* (2013.01)

(58) Field of Classification Search
CPC ... H04B 1/38; H04B 1/03; H01Q 3/00; H01Q 1/342; H01Q 1/243; H01Q 1/084
(Continued)

(56) References Cited

U.S. PATENT DOCUMENTS 5,760,749 A * 6/1998 Minowa ................. H01Q 13/00
343/772
5,835,068 A * 11/1998 Paul ......................... H01Q 3/08
343/757

(Continued)

FOREIGN PATENT DOCUMENTS

JP    H11-504195 A    4/1999
JP    2003-158465 A    5/2003
(Continued)

OTHER PUBLICATIONS

International Search Report corresponding to PCT/JP2015/000187, 2 pages, dated Mar. 24, 2015.

*Primary Examiner* — Edward Urban
*Assistant Examiner* — Ralph H Justus
(74) *Attorney, Agent, or Firm* — Wilmer Cutler Pickering Hale and Dorr LLP

(57) ABSTRACT

A mounting base (14) is fixed to an antenna (13) or an antenna bracket (15) for supporting the antenna (13). A baseband unit (11) and an RF unit (12) are fixed to the mounting base (14). The baseband unit (11) fixed to the mounting base (14) is disposed to face a back part (132) of the antenna (13) and to form a space between the back part (132) and the first enclosure (111). The RF unit (12) fixed to the mounting base (14) is disposed in the space formed between the back part (132) of the antenna (13) and the baseband unit (11) and is coupled to a waveguide flange (132) of the antenna (13). Thus, for example, in a configuration of a point-to-point wireless apparatus in which an RF unit and a baseband unit are separated, restrictions on installation space of the apparatus can be facilitated.

10 Claims, 11 Drawing Sheets

(58) Field of Classification Search
USPC .......... 455/575.7, 561, 562.1, 39, 90.1–90.3; 343/757, 758, 882, 763
See application file for complete search history.

(56) References Cited

U.S. PATENT DOCUMENTS

| | | | |
|---|---|---|---|
| 6,072,991 | A | 6/2000 | Paul et al. |
| 6,429,827 | B1 * | 8/2002 | Hsueh ...................... H01Q 1/42 343/702 |
| 7,050,765 | B2 * | 5/2006 | Ammar .................... H01Q 1/02 343/772 |
| 8,736,500 | B1 * | 5/2014 | Lam ......................... H01P 5/10 343/726 |
| 9,270,321 | B2 * | 2/2016 | Shen ........................ H04B 1/40 |
| 2003/0224801 | A1 * | 12/2003 | Lovberg ................. H01Q 1/125 455/454 |
| 2015/0018044 | A1 * | 1/2015 | Sekine ................ H04W 88/085 455/561 |
| 2016/0192041 | A1 * | 6/2016 | Pryor ....................... H04Q 9/00 340/870.07 |

FOREIGN PATENT DOCUMENTS

| | | |
|---|---|---|
| WO | WO-95/25387 A1 | 9/1995 |
| WO | WO-1998/010524 A1 | 3/1998 |
| WO | WO-2011/162281 A1 | 12/2011 |
| WO | WO-2013/118473 A1 | 8/2013 |

* cited by examiner

WIRELESS COMMUNICATION APPARATUS AND STRUCTURE FOR MOUNTING COMMUNICATION EQUIPMENT

CROSS-REFERENCE TO RELATED APPLICATIONS

This application is a national stage application of International Application No. PCT/JP2015/000187 entitled "WIRELESS COMMUNICATION APPARATUS AND STRUCTURE FOR MOUNTING COMMUNICATION EQUIPMENT," filed on Jan. 19, 2015, which claims the benefit of the priority of Japanese Patent Application No. 2014-028298 filed on Feb. 18, 2014, the disclosures of each of which are hereby incorporated by reference in their entirety.

TECHNICAL FIELD

The disclosure of the specification relates to a structure for mounting communication equipment for a point-to-point wireless apparatus.

BACKGROUND ART

Point-to-point wireless systems using microwaves, millimeter waves or the like are well known. In a point-to-point wireless system, two communication apparatuses perform digital communication via a point-to-point wireless link. To be more specific, each of the communication apparatuses is equipped with a directional antenna in order to communicate with a counterpart apparatus using a point-to-point wireless technology and forms a directional beam toward the counterpart apparatus. In this way, a point-to-point wireless link is established between the two communication apparatuses. In the specification, each of the two communication apparatuses constituting the point-to-point wireless system, i.e., a communication apparatus that communicates with a counterpart apparatus using the point-to-point wireless technology, will be referred to as a point-to-point wireless apparatus.

Compared to wired connections using optical fibers, point-to-point radio systems have many advantages such as easy networking, low costs, and mitigation of conditions for an installation location of a base station. The point-to-point wireless systems are used, for example, in a mobile backhaul. The mobile backhaul indicates communication lines that connect base stations in a cellular communication system to a core network and communication lines that connect between the base stations.

Patent Literature 1 and 2 discloses point-to-point wireless apparatuses. The point-to-point wireless apparatus disclosed in Patent Literature 1 includes an antenna and a front-end device (Outdoor Unit (ODU)) that are installed outdoors and a back-end device (Indoor Unit (IDU)) that is installed indoors. The front-end device (ODU) primarily performs analog signal processing at the carrier frequency (radio frequency (RF) band) such as frequency up/down conversion and amplification. The back-end device (IDU) primarily performs baseband digital signal processing such as channel coding/decoding, interleaving/deinterleaving, and modulation/demodulation. The front-end device may be referred to as an RF unit. The back-end device may be referred to as a baseband unit.

On the other hand, the point-to-point wireless apparatus disclosed in Patent Literature 2 has a structure in which electronic equipment for performing point-to-point wireless communication with a counterpart apparatus is accommodated in one enclosure that can be installed outdoors. To be more specific, the point-to-point wireless apparatus disclosed in Patent Literature 2 has a structure in which a front-end electronic circuit module and a back-end electronic circuit module are accommodated in one enclosure. The front-end electronic circuit module includes circuits that perform analog signal processing at the RF band (e.g., frequency conversion and signal amplification). The back-end electronic circuit module includes circuits that perform baseband digital signal processing (e.g., channel coding and modulation/demodulation). The front-end electronic circuit module may be referred to as an RF circuit. The back-end electronic circuit module may be referred to as a baseband circuit.

CITATION LIST

Patent Literature

Patent Literature 1: International Patent Publication No. WO2011/162281
Patent Literature 2: International Patent Publication No. WO2013/118473

SUMMARY OF INVENTION

Technical Problem

The point-to-point wireless apparatus having an integrated (all-in-one) configuration disclosed in Patent Literature 2 has a benefit in that wiring to connect an RF unit to a baseband unit that are separately disposed are unnecessary. However, the point-to-point wireless apparatus having an integrated configuration may be inconvenient in some other points.

For example, the front-end electronic circuit module (i.e., the RF circuit) needs different circuit elements (e.g., an amplifier) and different waveguide shapes depending on, for example, an operating carrier frequency and transmission power. On the other hand, the back-end electronic circuit module (i.e., the baseband circuit) can be the same regardless of a carrier frequency and transmission power. Thus, with a separate configuration in which the RF unit and the baseband unit are independent from each other, a carrier frequency and transmission power can be easily changed by replacing only the RF unit and not replacing the baseband unit. In addition, with the separate configuration, as it is easy to upgrade hardware of the RF unit or the baseband unit, this is considered to contribute to reduction in capital expenditure. Further, when the point-to-point wireless apparatus fails, only the RF unit or only the baseband unit can be replaced, and thus it is expected that operating expenditure will be reduced.

On the other hand, in another viewpoint, the separate configuration may be disadvantageous as compared to the integrated configuration. For example, it may be difficult to ensure spaces in which both the RF unit and the baseband unit will be installed. Further, with the separate configuration, a length of an intermediate frequency (IF) cable for connecting between the RF unit and the baseband unit may be greater than that in the integrated configuration. A long cable length may not be preferable in terms of a failure rate.

In view of the above, one of objects accomplished by embodiments disclosed in the specification is to provide a communication-equipment mounting structure for mounting a point-to-point wireless apparatus that can contribute to reduction in the above disadvantages of the separate configuration. It should be noted that this object is only one of the objects accomplished by the embodiments disclosed in the specification. Other objects or problems and novel features will be made apparent from the specification and the accompanying drawings.

Solution to Problem

In an aspect, a mounting structure includes a mounting base, a baseband unit, and an RF unit. The baseband unit includes a first enclosure adapted to accommodate a first electronic circuit module for performing baseband digital signal processing and to protect the first electronic circuit module from ingress of water and dust when installed outdoors. The RF unit includes a second enclosure adapted to accommodate a second electronic circuit module for performing analog signal processing at a carrier frequency and to protect the second electronic circuit module from ingress of water and dust when installed outdoors. The mounting base is adapted to be fixed to an antenna for communicating with a counterpart apparatus using a point-to-point wireless technology or fixed to an antenna bracket that is mounted to a structure for supporting the antenna. The antenna includes a front part arranged to radiate an electric field and a back part positioned opposite to the front part and equipped with a waveguide flange that is coupled to a waveguide of the RF unit. The baseband unit is adapted to be supported by the mounting base when the first enclosure is fixed to the mounting base. The baseband unit supported by the mounting base is disposed to face the back part and to form a space between the back part and the first enclosure. The RF unit is adapted to be supported by the mounting base when the second enclosure is fixed to the mounting base. The RF unit supported by the mounting base is disposed in the space and coupled to the waveguide flange.

Advantageous Effects of Invention

According to the above aspect, it is possible to provide a communication-equipment mounting structure for mounting a point-to-point wireless apparatus that can contribute to reduction in disadvantages of the separate configuration. It should be noted that this effect is merely one of effects expected to be accomplished by the embodiments disclosed in the specification.

DESCRIPTION OF EMBODIMENTS

Hereinafter, specific embodiments will be described in detail with reference to the drawings. The same or corresponding elements are denoted by the same reference signs throughout the drawings, and their repeated explanations will be omitted for the sake of clarity.

First Embodiment

Figure 1:
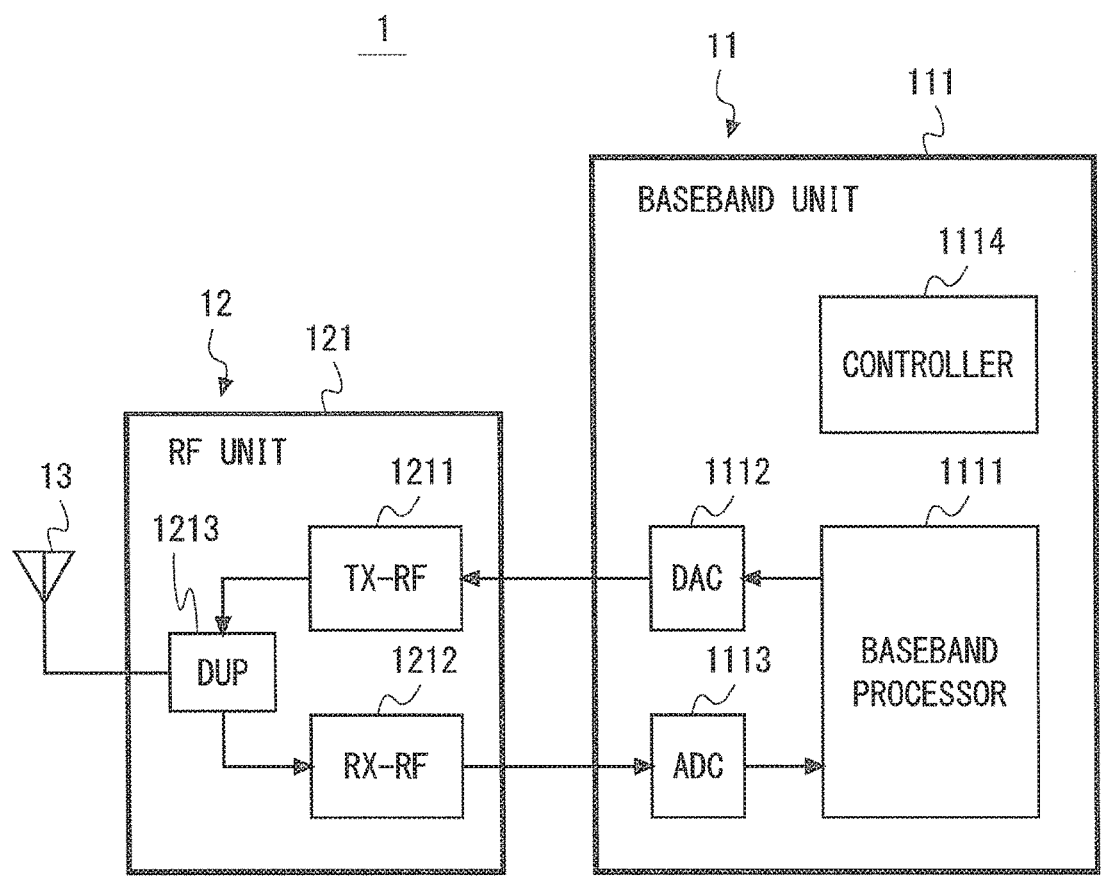
FIG. 1 is a block diagram showing a configuration example of a point-to-point wireless apparatus according to a first embodiment.

FIG. 1 is a block diagram showing a configuration example of a point-to-point wireless apparatus 1 according to this embodiment. The point-to-point wireless apparatus 1 employs the separate configuration. That is, the point-to-point wireless apparatus 1 includes a baseband unit 11 and an RF unit 12 that can both be installed outdoors. As shown in FIG. 1, the baseband unit 11 includes a baseband processor 1111 adapted to perform baseband digital signal processing. The baseband unit 11 may include other electronic circuit modules including, for example, a DA converter (DAC) 1112, an AD Converter (ADC) 1113, and a controller 1114.

In a transmission process, the baseband processor 1111 performs channel coding (e.g., Forward Error Correction (FEC) encoding) on transmission data, maps the coded data sequence to transmission symbols, limits the band of the transmission symbol sequence using a low-pass filter, and thus generates a transmission baseband signal. The DA converter 1112 converts the digital transmission baseband signal into an analog signal.

In a reception process, the AD converter 1113 converts the received IF signal to a digital signal. The baseband processor 1111 performs demodulation processing in the digital domain. That is, the baseband processor 1111 multiplies the digital received IF signal with a digital sinusoidal signal, performs a low-pass filtering process, and thus generates a quadrature baseband signal. The baseband processor 1111 performs symbol decision (symbol demapping) on the quadrature baseband signal and generates a received data sequence. Further, the baseband processor 1111 performs error correction on the received data sequence according in accordance with the channel coding scheme (e.g., FEC) that has been performed by the counterpart apparatus.

The controller 1114 performs overall control of the point-to-point wireless apparatus 1. For example, the controller 1114 adaptively adjusts a modulation scheme and a coding rate used in the baseband processor 1111 based on communication quality of the point-to-point wireless link.

The baseband unit 11 further includes an enclosure 111. The enclosure 111 accommodates electronic circuit modules of the baseband unit 11 (i.e., the baseband processor 1111, the DA converter 1112, the AD converter 1113, and the like) therein and protects the electronic circuit modules from ingress of water and dust when installed outdoors. The degree of protection from water and dust ingress of the enclosure 111 may be equivalent to the degree of IP66 according to IEC 60529 defined by International Electrotechnical Commission (IEC).

The RF unit 12 includes, as shown in FIG. 1, a TX-RF 1211 and a RX-RF 1212 that are adapted to perform analog signal processing at a carrier frequency. The TX-RF 1211 generate a modulated signal by mixings an analog transmission baseband signal supplied from the DA converter 1112 with a local oscillator signal, up-converts the modulated signal to a carrier frequency (i.e., radio frequency (RF)), amplifies the RF signal, and transmits it to an antenna 13. The RX-RF 1212 amplifies a received RF signal received by the antenna 13 with a Low Noise Amplifier (LNA) and down-converts the received RF signal to an intermediate frequency (IF) band.

FIG. 1 shows an example in which bidirectional communication is performed by Frequency Division Duplex (FDD), and, accordingly, a duplexer 1213 is used in the RF unit 12 in order to separate a transmission frequency band from a reception frequency band. Instead, the point-to-point wireless apparatus 1 may perform bidirectional communication by Time Division Duplex (TDD). In the case of TDD, a high-frequency switch may be used in place of the duplexer 1213 to switch between transmission and reception.

The RF unit 12 further includes an enclosure 121. The enclosure 121 accommodates electronic circuit modules of the RF unit 12 (i.e., the TX-RF 1211, the RX-RF 1212, and the like) therein and protects the electronic circuit modules from ingress of water and dust when installed outdoors. The degree of protection from water and dust ingress of the enclosure 121 may be equivalent to the degree of IP66 according to IEC 60529 defined by International Electrotechnical Commission (IEC).

Figure 2:
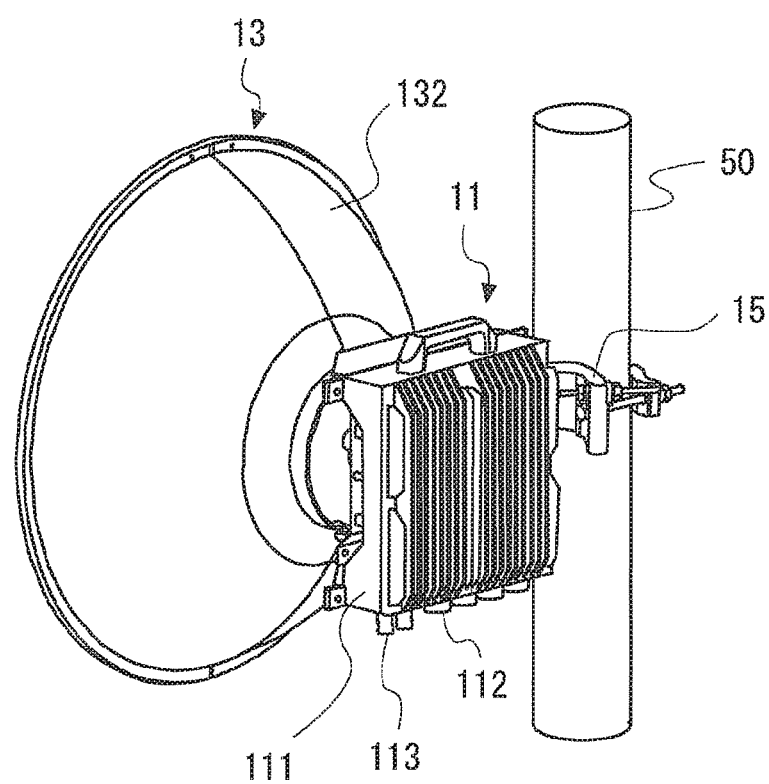
FIG. 2 is a drawing showing an external structure example and an installation example of the point-to-point wireless apparatus according to the first embodiment.
Figure 3:
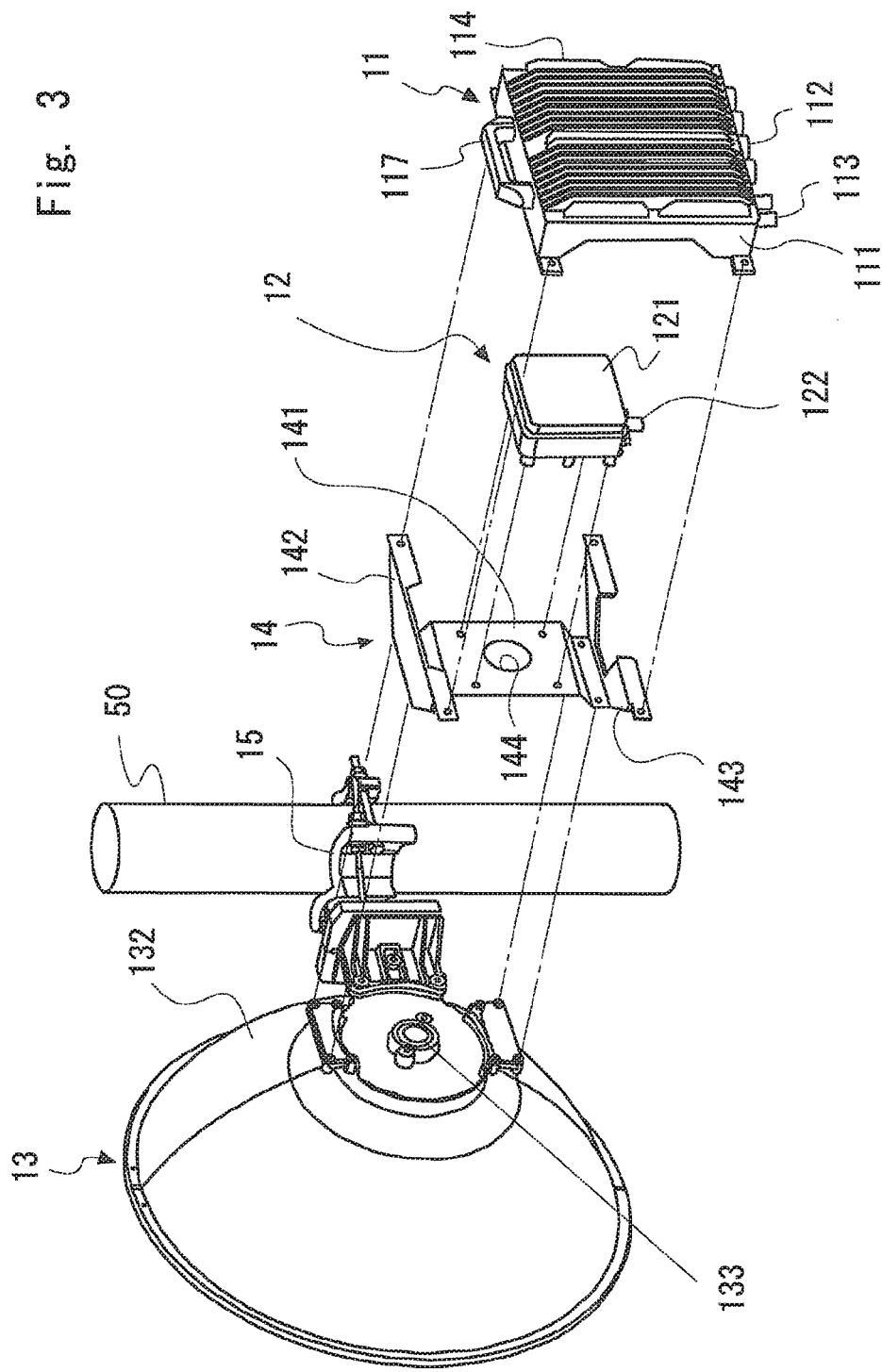
FIG. 3 is an exploded view of the point-to-point wireless apparatus according to the first embodiment.
Figure 4:
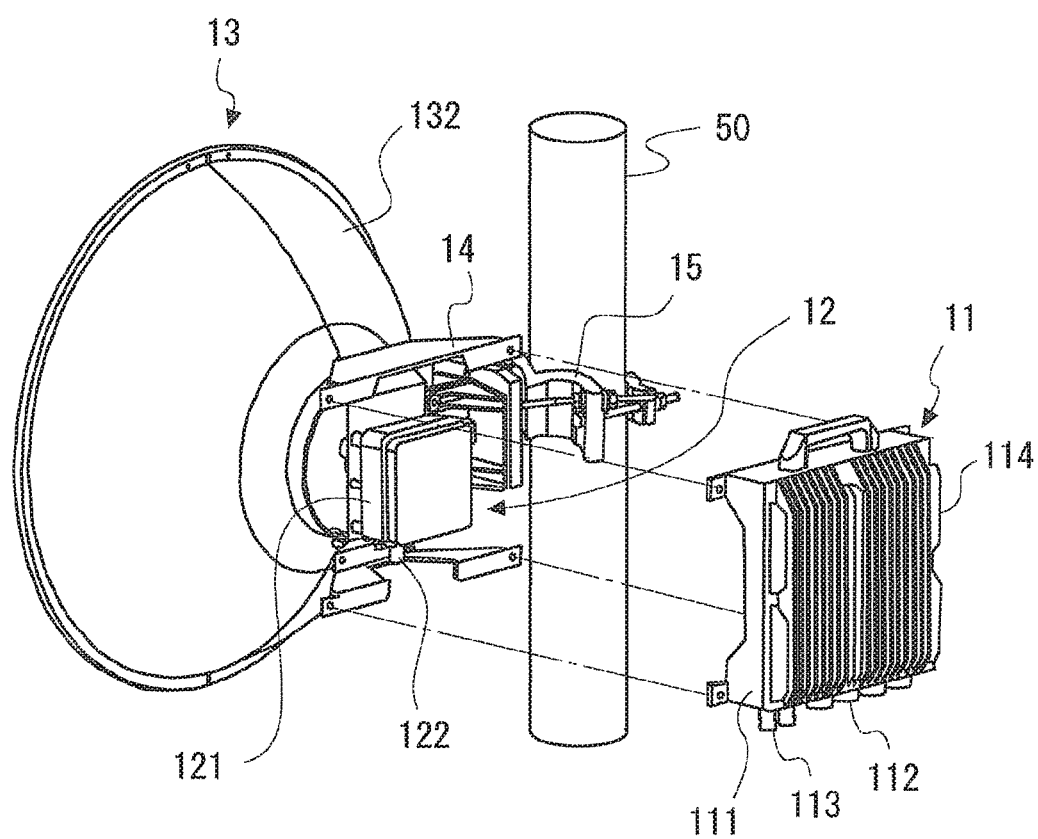
FIG. 4 is an exploded view of the point-to-point wireless apparatus according to the first embodiment.
Figure 5:
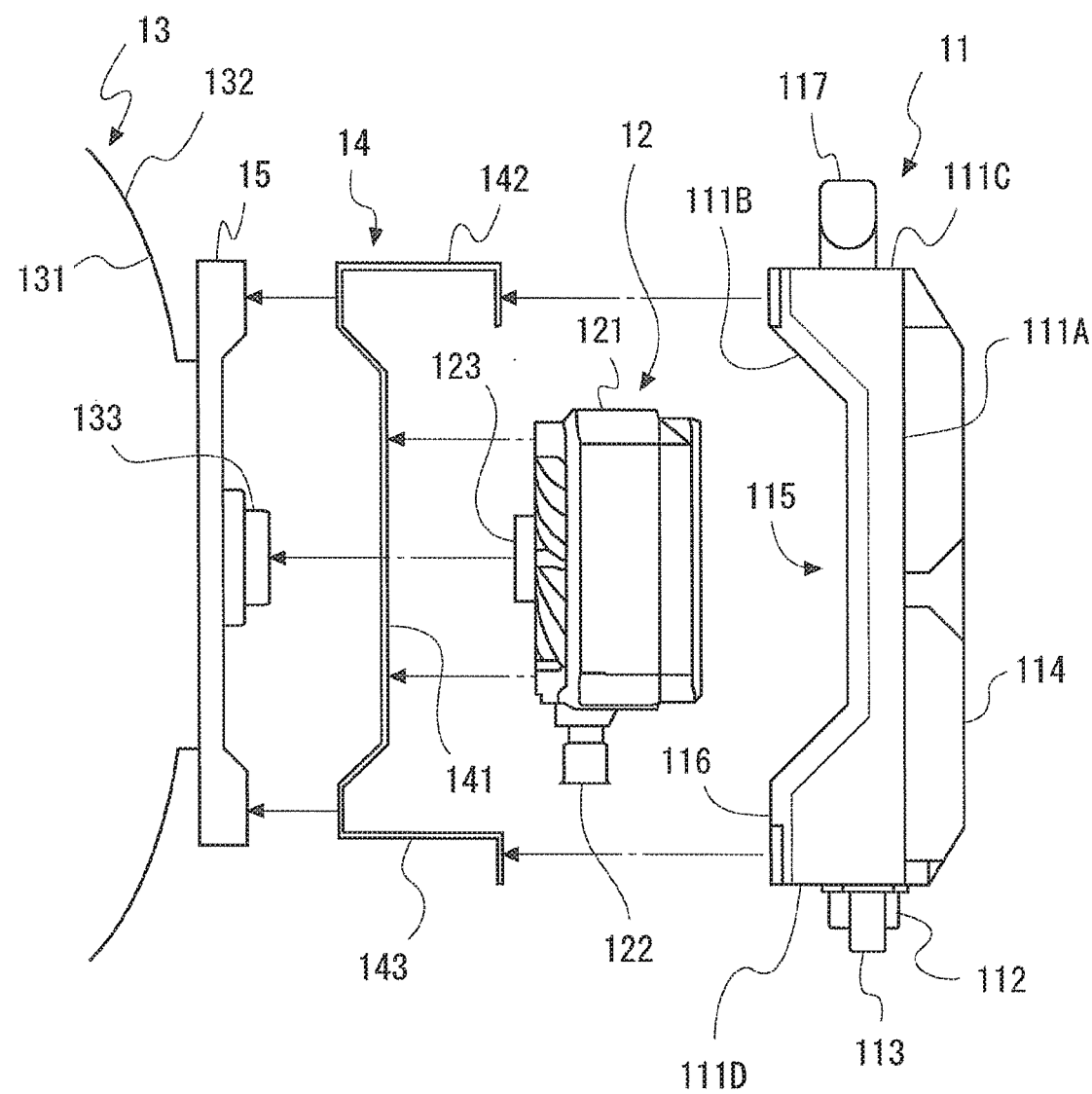
FIG. 5 is an exploded side view of the point-to-point wireless apparatus according to the first embodiment.
Figure 6:
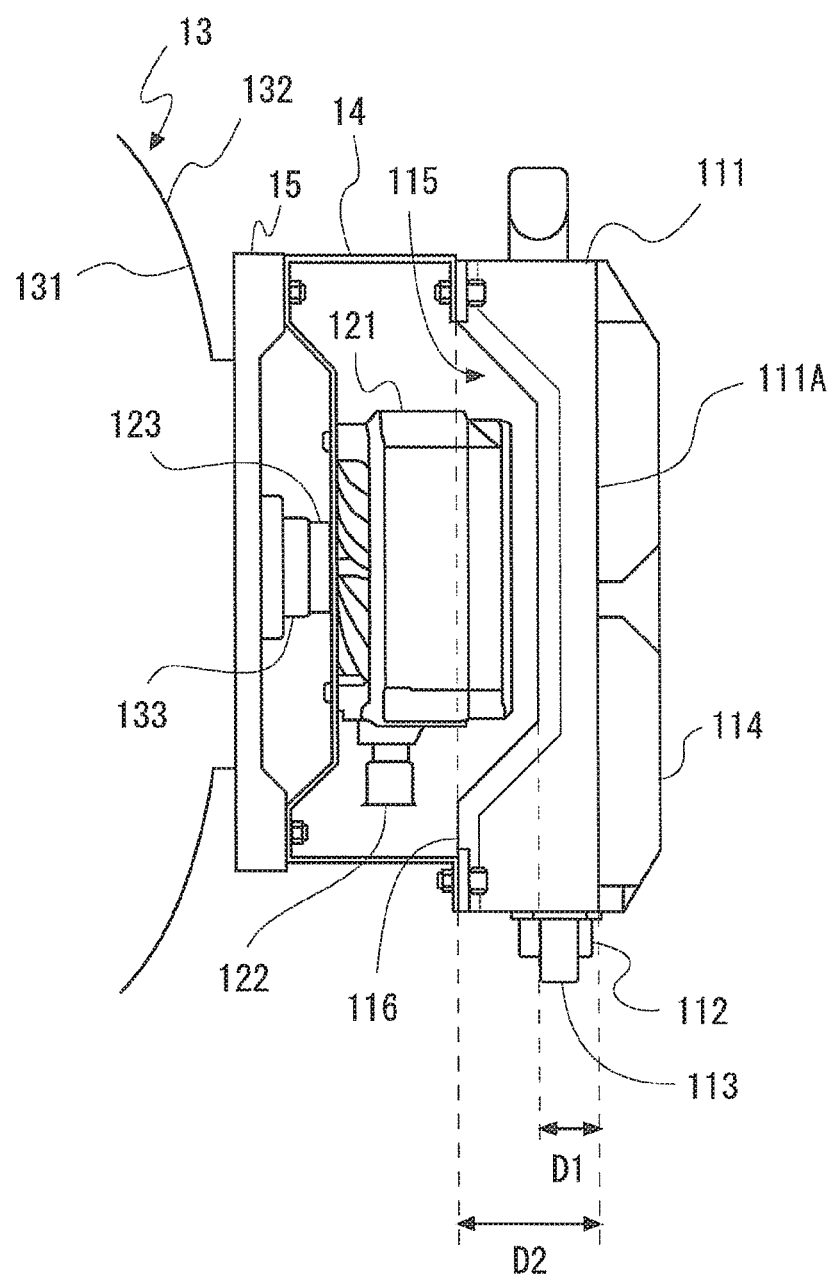
FIG. 6 is a side view of the point-to-point wireless apparatus according to the first embodiment.

Hereinafter, an external structure example and an installation example of the point-to-point wireless apparatus 1 are described with reference to FIGS. 2 to 6. FIG. 2 shows an external structure example and an installation example of the point-to-point wireless apparatus 1. FIGS. 3 and 4 provide exploded views of the point-to-point wireless apparatus 1. FIGS. 5 and 6 provide exploded side views of the point-to-point wireless apparatus 1.

In the example shown in FIGS. 2 to 6, the baseband unit 11 includes receptacles 112 and 113, heat-dissipation fins 114, and a grip (a handle) 117. The receptacles 112 and 113 are disposed on a bottom surface 111D of the enclosure 111. The heat-dissipation fins 114 are disposed on a front surface 111A of the enclosure 111. The grip 117 is disposed on a top surface 111C of the enclosure 111 and used to grip the enclosure 111. The receptacle 112 is connected with a communication cable for connecting the baseband unit 11 to an external apparatus (e.g., a base station apparatus, a router, or a layer-2 switch). The receptacle 113 is connected with a communication cable (an IF cable) for connecting the baseband unit 11 to the RF unit 12. The receptacle 112 may also be used to supply power to the baseband unit 11. The power supply may be performed by, for example, Power over Ethernet (PoE).

In the example shown in FIGS. 2 to 6, the enclosure 121 of the RF unit 12 is equipped with a receptacle 122 and a waveguide flange 123. The receptacle 122 is connected with a communication cable (an IF cable) for connecting the baseband unit 11 to the RF unit 12. The waveguide flange 123 is coupled to a waveguide flange 133 of the antenna 13 for electric field emission.

In the example shown in FIGS. 2 to 6, the antenna 13 includes a front part 131 arranged to radiate an electric field and a back part 132. The front part 131 includes a surface arranged to radiate an electric field toward a counterpart apparatus in point-to-point communication. The back part 132 is positioned opposite to the front part 131 and is equipped with the waveguide flange 133. The waveguide flange 133 is coupled to the waveguide of the RF unit 12 (i.e., the waveguide flange 123). The antenna 13 is supported by an antenna bracket 15. The antenna bracket 15 is mounted on a structure 50 (e.g., a lamppost, a building wall surface, or an antenna tower).

In the example shown in FIGS. 2 to 6, a mounting base 14 is used to mount the baseband unit 11 and the RF unit 12 on the antenna 13 or the antenna bracket 15. The mounting base 14 is fixed to the antenna 13 or the antenna bracket 15. In the example shown in FIGS. 2 to 6, the mounting base 14 is fixed to the back part 132 of the antenna 13.

The baseband unit 11 is adapted to be supported by the mounting base 14 when the enclosure 111 of the baseband unit 11 is fixed to the mounting base 14. Likewise, the RF unit 12 is adapted to be supported by the mounting base 14 when the enclosure 121 of the RF unit 12 is fixed to the mounting base 14. The baseband unit 11 supported by the mounting base 14 is disposed to face the back part 132 of the antenna 13 and to form a space between the back part 132 and the enclosure 111 (i.e., the baseband unit 11). The RF unit 12 supported by the mounting base 14 is disposed in the space between the back part 132 and the enclosure 111 (i.e., the baseband unit 11). Further, the RF unit 12 supported by the mounting base 14 is coupled to the waveguide flange 133 of the antenna 13 via its waveguide flange 123.

In the structure example shown in FIGS. 2 to 6, the mounting base 14 includes a mounting plate 141, an upper stay member 142, and a lower stay member 143 in order to form the space in which the RF unit 12 is disposed. The mounting plate 141 has a planar surface on which the RF unit 12 is disposed and an opening 144 on its surface. The opening 144 is used to couple the waveguide flange 133 of the antenna 13 to the waveguide flange 123 of the RF unit 12 through the mounting plate 141 interposed therebetween. The upper stay member 142 and the lower stay member 143 rise from the mounting plate 141 and are used to support the baseband unit 11.

As has been understood from the above descriptions, the point-to-point wireless apparatus 1 employs the separate configuration, and the baseband unit 11 and the RF unit 12 have the separate enclosures 111 and 112, respectively. However, if the baseband unit 11 and the RF unit 12 are separately arranged, one or both of the problems regarding the installation space and the IF-cable length, which have already been described, may occur. Accordingly, in this embodiment, as shown in FIGS. 2 to 6, both the baseband unit 11 and the RF unit 12 are disposed adjacent to the back part 132 of the antenna 13. It is thus possible to reduce the disadvantages of the separate configuration (i.e., the problem regarding the installation space or the problem regarding the IF cable length).

Hereinafter, further improvements incorporated into this embodiment are described. In one improvement, as shown in FIGS. 5 and 6, a recessed region 115 may be formed in a central part of the rear surface 111B of the enclosure 111 of the baseband unit 11. The rear surface 111B is positioned opposite to the front surface 111A and faces the back part 132 of the antenna 13 when the enclosure 111 is supported by the mounting base. The recessed region 115 is recessed inwardly of the enclosure 111. As shown in FIG. 6 (the side view), at least a part of the enclosure 121 of the RF unit 12 may be disposed in the recessed region 115, in a side view of the enclosure 111, when the baseband unit 11 and the RF unit 12 are supported by the mounting base 14.

In the separate configuration, it is necessary to accommodate the baseband unit 11 and the RF unit 12 in the separate enclosures 111 and 121, respectively. Accordingly, in most cases, the entire volume and the entire installation space of the point-to-point wireless apparatus 1 having the separate configuration may be greater than those of the integrated configuration. However, the structure shown in FIGS. 5 and 6, in which at least a part of the enclosure 121 is disposed in the recessed region 115 in a side view, can reduce a thickness of the apparatus (i.e., a protrusion from the back part 132 of the antenna 13) when the baseband unit 11 and the RF unit 12 are installed, and thereby reducing a volume of the point-to-point wireless apparatus 1 when it is installed.

In another improvement, as shown in FIGS. 2 and 5, the baseband unit 11 may be equipped with the grip (the handle) 117. The grip 117 allows easy and secure removal of the baseband unit 11 when the RF unit 12 is replaced, which is necessary in the case of changing a carrier frequency or transmission power of the RF unit 12. The point-to-point wireless apparatus 1 is in most cases installed on a tall antenna tower, and, accordingly, safe and easy exchange of the RF unit 12 is extremely important in maintenance operations at such a high place. In particular, since the size and weight of the baseband unit 11 are greater than those of the RF unit 12, the grip 117 provided on the baseband unit 11 can contribute to reduction of the disadvantages of the separate configuration.

Figure 7:
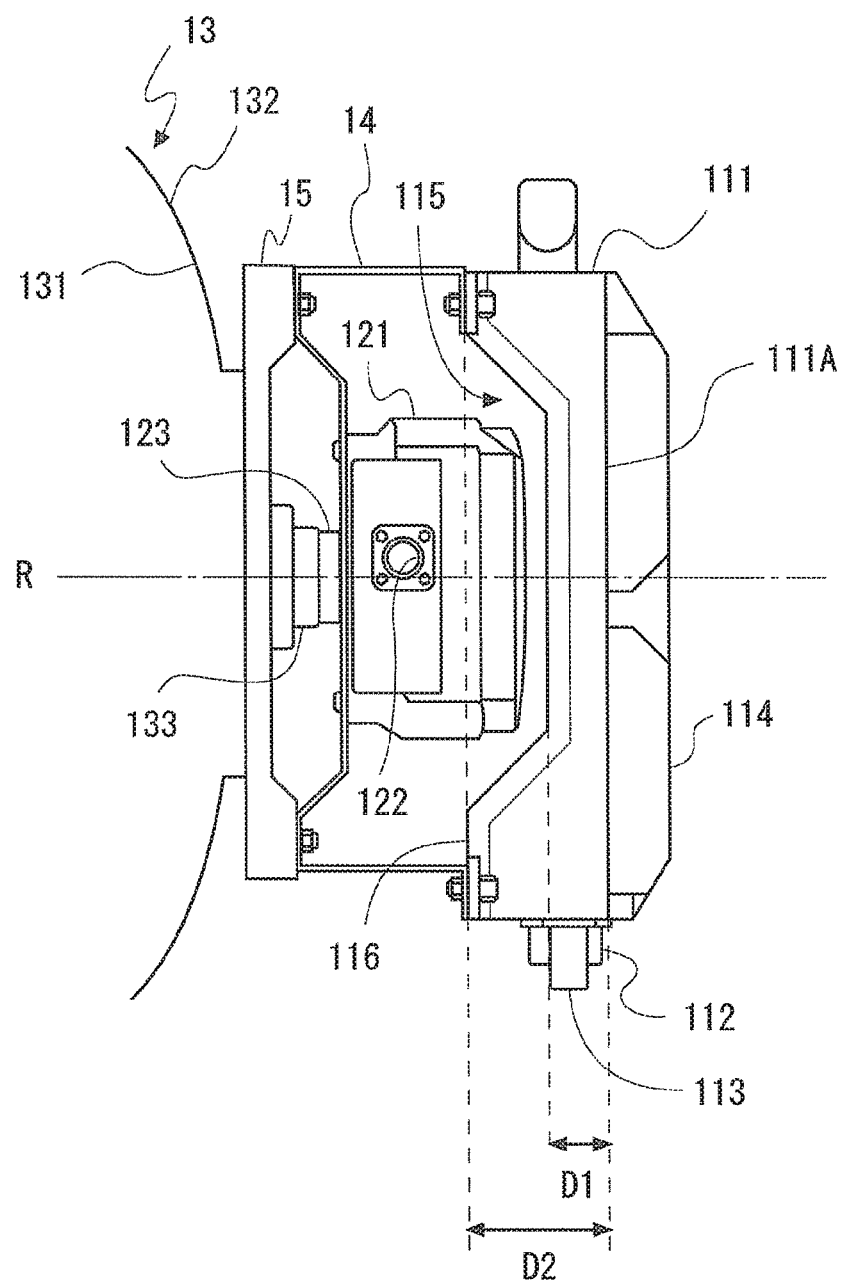
FIG. 7 is a side view of the point-to-point wireless apparatus according to the first embodiment.

In the above improvement, the RF unit 12 supported by the mounting base 14 may be adapted to be selectively disposed in a first orientation shown in FIG. 6 or in a second orientation shown in FIG. 7. The second orientation shown in FIG. 7 is an orientation rotated 90 degrees from the first orientation about a rotation axis R passing through the waveguide flanges 123 and 133. The plane of polarization of an electric field wave (linearly polarized wave) radiated from the antenna 13 can be easily inclined by changing the orientation of the RF unit 12 from the first orientation to the second orientation. For example, the first orientation corresponds to vertical polarization, while the second orientation corresponds to horizontal polarization. The recessed region 115 of the baseband unit 11 may have a shape configured to not interfere with the enclosure 121 of the RF unit 12 when the RF unit 12 is either in the first orientation (FIG. 6) or in the second orientation (FIG. 7). In this way, the orientation of the RF unit 12 disposed in the space between the baseband unit 11 and the antenna 13 can be physically rotated while the orientation of the baseband unit 11 is fixed, and thus polarization of the point-to-point wireless apparatus 1 can be easily changed.

In the above improvement, as shown in FIGS. 5 and 6, at least one of the receptacles 112 and 113 may be disposed on the bottom surface 111D of the enclosure 111. The rear surface 111B of the enclosure 111 includes a region 116 that is positioned around the recessed region 115. In the side views of the enclosure 111 shown in FIGS. 5 and 6, a thickness (D2) between the region 116 and the front surface 111A is greater than a thickness (D1) between the recessed region 115 and the front surface 111A. Therefore, disposing the receptacle 112 or the receptacle 113 or both on the bottom surface 111D, which is continuous with the surrounding region 116, contributes to allowing an increase in the depth of the recessed region 115. This is because the thickness (D1) of the enclosure 111 in the recessed region 116 can be reduced regardless of the shape of the receptacle 112 or the shape of the receptacle 113 or both.

Second Embodiment

Figure 8:
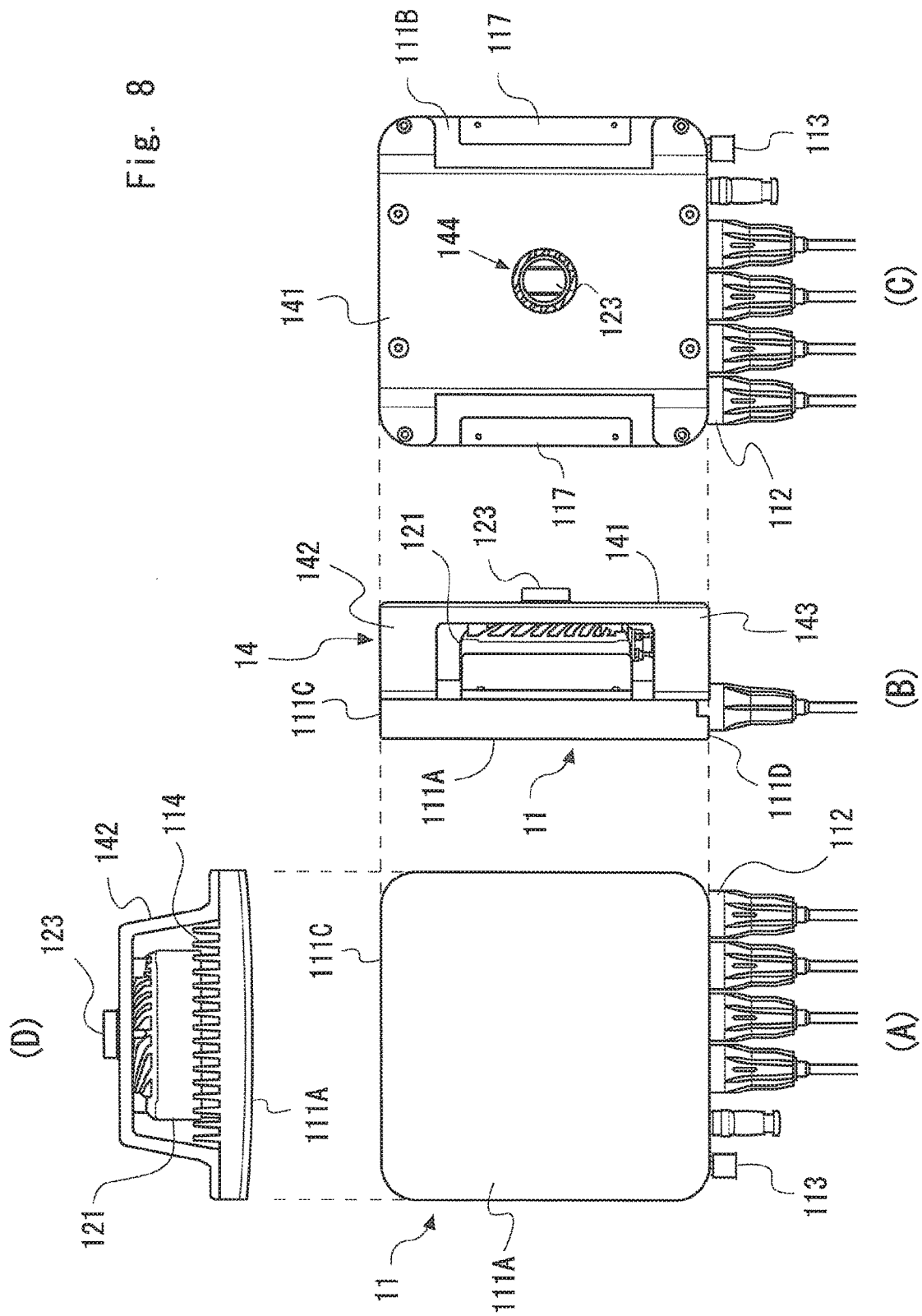
FIG. 8 is a projection view showing a front surface, a right surface, a rear surface, and a top surface of a point-to-point wireless apparatus according to a second embodiment.
Figure 9:
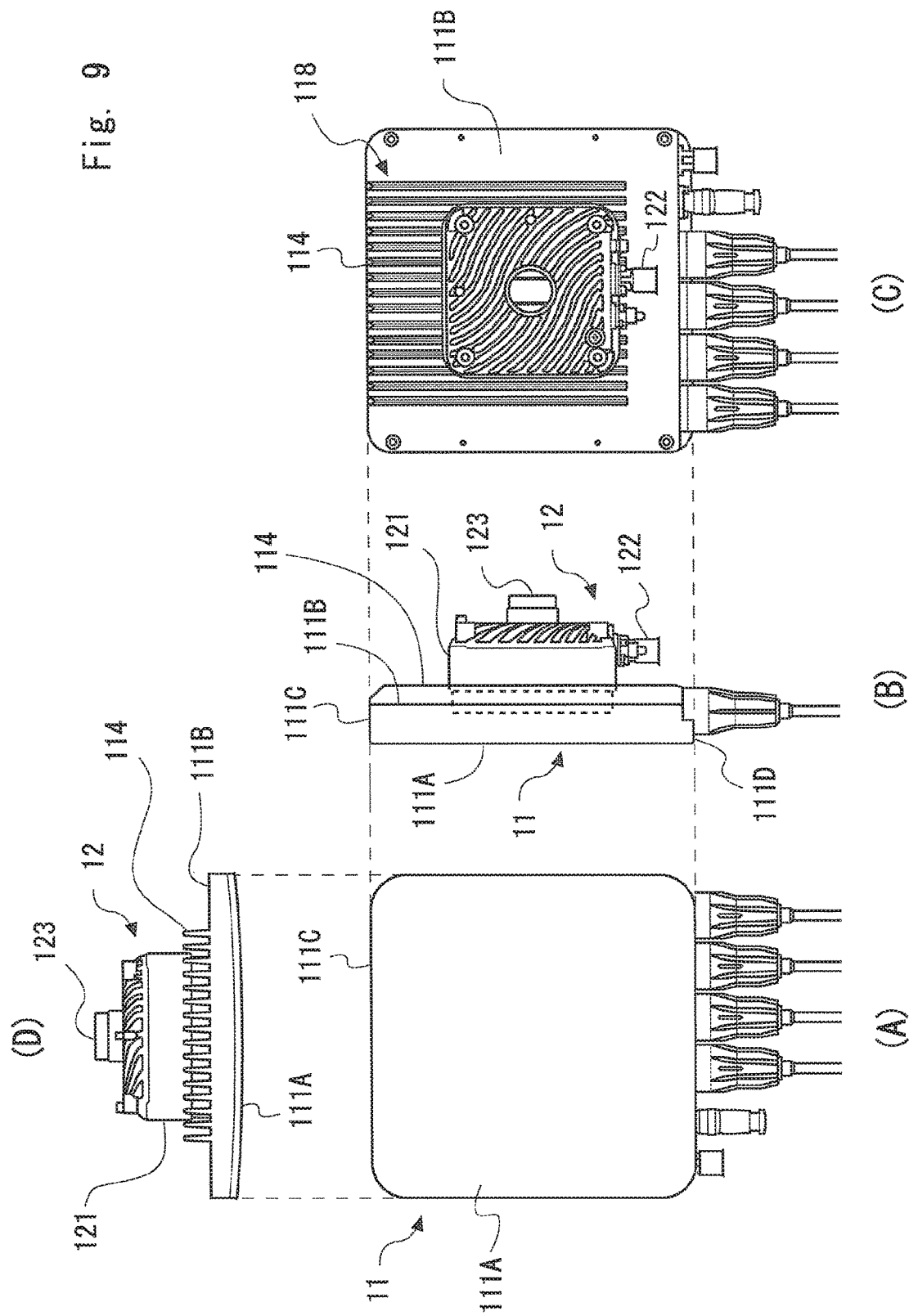
FIG. 9 is a projection view showing a front surface, a right surface, a rear surface, and a top surface of the point-to-point wireless apparatus according to the second embodiment.
Figure 10:
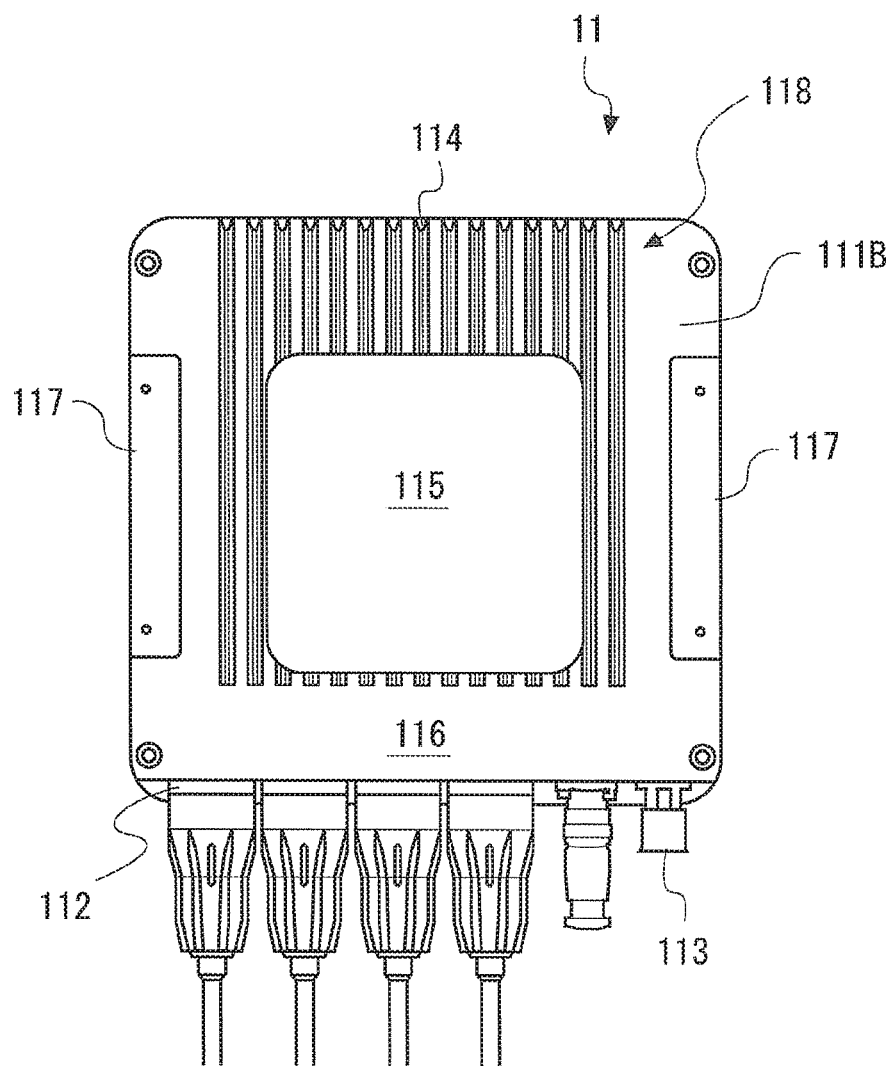
FIG. 10 is a drawing showing a surface of a baseband unit (the rear surface) having a recessed region according to the second embodiment.
Figure 11:
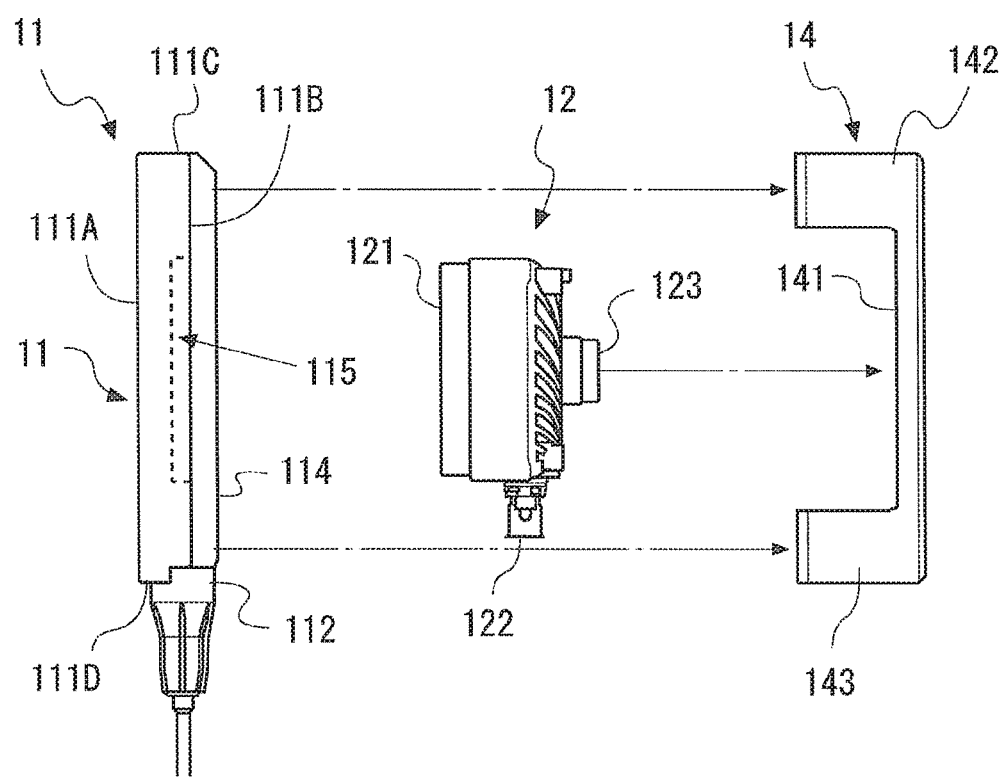
FIG. 11 is an exploded side view of the point-to-point wireless apparatus according to the second embodiment.

In this embodiment, a modified example of the external structure of the point-to-point wireless apparatus 1 is described with reference to FIGS. 8 to 11. The devices, elements, and members shown in FIGS. 8 to 11 are denoted by the same reference signs as the corresponding devices, elements, and members shown in FIGS. 1 to 7 for easy comparison. FIGS. 8 and 9 are projection views showing a front view (A), a right view (B), a rear view (C), and a top view (D) of the point-to-point wireless apparatus 1. FIG. 8 omits the antenna 13, and only illustrates positional relationship among the baseband unit 11, the RF unit 12, and the mounting base 14 when the point-to-point wireless apparatus 1 is installed. Further, the mounting base 14 and the grip 117 illustrated in FIG. 8 are omitted in FIG. 9, and FIG. 9 only illustrates positional relationship between the baseband unit 11 and the RF unit 12. FIG. 10 is a rear view of the baseband unit 11 and illustrates a detailed structure of the rear surface 111B of the enclosure 111. FIG. 11 is an exploded side view of the baseband unit 11, the RF unit 12, and the mounting base 14.

Basic features of the structure example shown in FIGS. 8 to 11 are the same as those of the structure example shown in FIGS. 2 to 7. That is, the RF unit 12 is disposed in the space formed when the baseband unit 11 is mounted on the mounting base 14 (i.e., the space between the rear surface 111B of the enclosure 111 and the mounting plate 141). That is, both the baseband unit 11 and the RF unit 12 are disposed adjacent to the back part 132 of the antenna 13. It is thus possible to reduce the disadvantages of the separate configuration (i.e., the problem regarding the installation space or the problem regarding the IF cable length).

Further, as shown in FIGS. 10 and 11, the rear surface 111B of the enclosure 111 may include the recessed region 115. As shown in FIGS. 9 and 11, at least a part of the enclosure 121 of the RF unit 12 may be disposed in the recessed region 115, in a side view of the enclosure 111, when the baseband unit 11 and the RF unit 12 are supported by the mounting base 14. It is thus possible to reduce the thickness of the apparatus when the baseband unit 11 and the RF unit 12 are installed, and thus also reduce the volume of the point-to-point wireless apparatus 1 when it is installed.

Further, as shown in FIG. 10, the recessed region 115 of the baseband unit 11 may have a shape configured to not interfere with the enclosure 121 of the RF unit 12 when the RF unit 12 is either in the first orientation (for vertical polarization) or in the second orientation (for horizontal polarization). In this way, the orientation of the RF unit 12 can be physically rotated while the orientation of the baseband unit 11 is fixed, and thus polarization of the point-to-point wireless apparatus 1 can be easily changed.

Moreover, as shown in FIGS. 8 to 11, the receptacle 112 or the receptacle 113 or both may be disposed on the bottom surface 111D, which is continuous with the surrounding region 116. In this way, the thickness (D1) of the enclosure 111 in the recessed region 116 can be reduced regardless of the shape of the receptacle 112 or the shape of the receptacle 113 or both. It is thus possible to contribute to allowing an increase in the depth of the recessed region 115.

In the structure example shown in FIGS. 8 to 11, the position of the heat-dissipation fins 114 is changed from the configuration example shown in FIGS. 2 to 7. To be more specific, the heat-dissipation fins 114 are disposed on the rear surface 111B of the enclosure 111 in the configuration example shown in FIGS. 8 to 11 and not on the front surface 111A as in the configuration example shown in FIGS. 2 to 7. As shown in FIGS. 9 and 10, the heat-dissipation fins 114 are disposed on at least a region 118. The region 118, which is a part of the rear surface 111B of the enclosure 111, is positioned between the recessed region 115 and the top surface 111C of the enclosure 111. Such a position of the heat-dissipation fins 114 contributes not only to improving the appearance of the point-to-point wireless apparatus 1 but also to reducing the volume of the point-to-point wireless apparatus 1 when it is installed.

In the structure example shown in FIGS. 8 to 11, the position of the grip 117 is changed from the configuration example shown in FIGS. 2 to 7. To be more specific, the grip 117 is provided on the rear surface 116 of the enclosure 111 in such a way that the grip 117 cannot be seen in a front view of the enclosure 111. Such a position of the grip 117 contributes not only to improving the appearance of the point-to-point wireless apparatus 1 but also to reducing the volume of the point-to-point wireless apparatus 1 when it is installed.

The above embodiments are merely examples of applications of the technical ideas obtained by the present inventor. These technical ideas are not limited to the above-mentioned embodiments, and the above embodiments may be modified in various ways.

The present application is based upon and claims the benefit of priority from Japanese Patent Application No. 2014-028298, filed on Feb. 18, 2014, the entire contents of which are hereby incorporated by reference.

REFERENCE SIGNS LIST

1 POINT-TO-POINT WIRELESS APPARATUS
11 BASEBAND UNIT
12 RF UNIT
13 ANTENNA
14 MOUNTING BASE
15 ANTENNA BRACKET
50 STRUCTURE
111 ENCLOSURE
111A FRONT SURFACE
111B REAR SURFACE
111C TOP SURFACE
111D BOTTOM SURFACE
112 RECEPTACLE
113 RECEPTACLE
114 HEAT-DISSIPATION FINS
115 RECESSED REGION
117 GRIP (HANDLE)
121 ENCLOSURE
122 RECEPTACLE
123 WAVEGUIDE FLANGE
131 FRONT PART
132 BACK PART
133 WAVEGUIDE FLANGE
141 MOUNTING PLATE
142 UPPER STAY MEMBER
143 LOWER STAY MEMBER
144 OPENING
116 GRIP
1111 BASEBAND PROCESSOR
1112 DA CONVERTER
1113 AD CONVERTER
1114 CONTROLLER
1211 TX-RF
1212 RX-RF
1213 DUPLEXER

The invention claimed is:

1. A wireless communication apparatus comprising:
a mounting base;
a baseband unit comprising a first enclosure, the first enclosure adapted to accommodate a first electronic circuit module for performing baseband digital signal processing and to protect the first electronic circuit module from ingress of at least one of water and dust when installed outdoors; and
a radio frequency (RF) unit comprising a second enclosure, the second enclosure adapted to accommodate a second electronic circuit module for performing analog signal processing at a carrier frequency and to protect the second electronic circuit module from ingress of at least one of water and dust when installed outdoors, wherein
the mounting base is adapted to be fixed to an antenna that includes a front part arranged to radiate an electric field and a back part opposite to the front part for communicating with a counterpart apparatus using a point-to-point wireless technology or fixed to an antenna bracket for supporting the antenna,
the baseband unit is adapted to be supported by the mounting base when the first enclosure is fixed to the mounting base,
the baseband unit supported by the mounting base is disposed to face the back part and to form a space between the back part and the first enclosure,
the RF unit is adapted to be supported by the mounting base when the second enclosure is fixed to the mounting base, and
the RF unit is adapted to be supported by the mounting base in a manner such that the RF unit is disposed in the space and coupled to the back part of the antenna.

2. The wireless communication apparatus according to claim 1, wherein
the first enclosure comprises a first surface that faces the back part when the first enclosure is supported by the mounting base, a second surface opposite to the first surface, and a plurality of side surfaces connecting the first surface to the second surface,
a recessed region is formed in a central part of the first surface, and
the RF unit is adapted to be supported by the mounting base in a manner that at least a part of the second enclosure is disposed in the recessed region, in a side view of the first enclosure, when the baseband unit and the RF unit are supported by the mounting base.

3. The wireless communication apparatus according to claim 2, wherein
the RF unit supported by the mounting base is adapted to be selectively disposed in a first orientation corresponding to a first polarization or in a second orientation corresponding to a second polarization rotated 90 degrees from the first polarization, and
the recessed region has a shape configured to not interfere with the second enclosure when the RF unit is either in the first orientation or the second orientation.

4. The wireless communication apparatus according to claim 2, wherein
the plurality of side surfaces include a top surface that is positioned at a vertically upper side when the mounting base is mounted on the antenna or the antenna bracket, and the first surface comprises a first region that is positioned between the top surface and the recessed region, and heat-dissipation fins are formed in the first region.

5. The wireless communication apparatus according to claim 2, wherein
the plurality of side surfaces comprise a bottom surface that is positioned at a vertically lower side when the mounting base is mounted on the antenna or the antenna bracket,
the first surface comprises a second region that is positioned between the recessed region and the bottom surface,
in a side view of the first enclosure, a thickness between the second region and the second surface is greater than a thickness between the recessed region and the second surface, and
the bottom surface comprises a first electrical-cable receptacle for connecting the base band unit to an external apparatus and a second communication-cable receptacle for connecting the baseband unit to the RF unit.

6. The wireless communication apparatus according to claim 1, wherein
the RF unit supported by the mounting base is adapted to be selectively disposed in a first orientation corresponding to a first polarization or in a second orientation corresponding to a second polarization rotated 90 degrees from the first polarization, and
the mounting base is adapted to support the first enclosure and the second enclosure in a manner such that the first enclosure does not interfere with the second enclosure when the RF unit is either in the first orientation or the second orientation.

7. A wireless communication apparatus configured to perform wireless communication with a counterpart apparatus using a point-to-point wireless technology, the wireless communication apparatus comprising:
a baseband unit comprising a first enclosure, wherein the first enclosure is adapted to accommodate a first electronic circuit module for performing baseband digital signal processing and to protect the first electronic circuit module from ingress of at least one of water and dust when installed outdoors, and the first enclosure comprises a handle; and
a Radio frequency (RF) unit comprising a second enclosure, wherein the second enclosure is adapted to be connected to the baseband unit with a communication cable for transmitting and receiving signals at an intermediate frequency, to accommodate a second electronic circuit module for performing analog signal processing at a carrier frequency, and to protect the second electronic circuit module from ingress of at least one of water and dust when installed outdoors; and
a mounting base adapted to support the second enclosure and the first enclosure and to fix the first enclosure and the second enclosure to a structure, the first enclosure being mounted to cover the second enclosure.

8. The wireless communication apparatus according to claim 7, wherein
the RF unit supported by the mounting base is adapted to be selectively disposed in a first orientation corresponding to a first polarization or in a second orientation corresponding to a second polarization rotated 90 degrees from the first polarization, and
the mounting base is adapted to support the first enclosure and the second enclosure in a manner such that the first enclosure does not interfere with the second enclosure when the RF unit is either in the first orientation or the second orientation.

9. A wireless communication apparatus configured to perform wireless communication with a counterpart apparatus using a point-to-point wireless technology, the wireless communication apparatus comprising:
a baseband unit comprising a first enclosure, wherein the first enclosure is adapted to accommodate a first electronic circuit module for performing baseband digital signal processing and to protect the first electronic circuit module from ingress of at least one of water and dust when installed outdoors; and
a Radio frequency (RF) unit comprising a second enclosure, wherein the second enclosure is adapted to be connected to the baseband unit with a communication cable for transmitting and receiving signals at an intermediate frequency, to accommodate a second electronic circuit module for performing analog signal processing at a carrier frequency, and to protect the second electronic circuit module from ingress of at least one of water and dust when installed outdoors, and wherein the second enclosure comprises a first surface on which an antenna interface to be connected to an antenna is formed and a second surface opposite to the first surface; and
a mounting base adapted to support the second enclosure and the first enclosure and to fix the first enclosure and the second enclosure to a structure in a manner such that the second enclosure is located next to the first enclosure and such that the second surface of the second enclosure faces toward the first enclosure.

10. The wireless communication apparatus according to claim 9, wherein
the RF unit supported by the mounting base is adapted to be selectively disposed in a first orientation corresponding to a first polarization or in a second orientation corresponding to a second polarization rotated 90 degrees from the first polarization, and
the mounting base is adapted to support the first enclosure and the second enclosure in a manner such that the first enclosure does not interfere with the second enclosure when the RF unit is either in the first orientation or the second orientation.

* * * * *